United States Patent
Bostick et al.

(10) Patent No.: US 10,139,836 B2
(45) Date of Patent: Nov. 27, 2018

(54) AUTONOMOUS AERIAL POINT OF ATTRACTION HIGHLIGHTING FOR TOUR GUIDES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/277,305

(22) Filed: Sep. 27, 2016

(65) Prior Publication Data
US 2018/0088595 A1 Mar. 29, 2018

(51) Int. Cl.
*G05D 1/10* (2006.01)
*G06Q 50/14* (2012.01)
(Continued)

(52) U.S. Cl.
CPC ........... *G05D 1/101* (2013.01); *G05D 1/0088* (2013.01); *G06F 17/30241* (2013.01);
(Continued)

(58) Field of Classification Search
None
See application file for complete search history.

(56) References Cited

U.S. PATENT DOCUMENTS 9,122,456 B2 * 9/2015 Kamin-Lyndgaard ........................ G09G 5/006
9,471,059 B1 * 10/2016 Wilkins ............... G05D 1/0016
(Continued)

FOREIGN PATENT DOCUMENTS

CN 103576690 A 2/2014
EP 2151661 A1 2/2010
(Continued)

OTHER PUBLICATIONS

Rutkin, Aviva; "First-person drone tourism will let you see the sights from home"; New Scientist; Technology News Jun. 1, 2015; 4 pages; © Reed Business Information Ltd.; <https://www.newscientist.com/article/dn27631-first-person-drone-tourism-will-let-you-see-the-sights-from-home/>.

(Continued)

*Primary Examiner* — Jean Paul Cass
(74) *Attorney, Agent, or Firm* — A. Imtiaz Billah; Brian M. Restauro (57) ABSTRACT

Embodiments of the present invention provide systems and methods for highlighting a point of attraction. Automatic aerial vehicles can be used by tour guides and tourists to be sent to a requested point of attraction. The requested point of attraction is not clearly visible to the tour guides and tourists. The tour guides and tourists send a request to a server which sends an automatic aerial vehicle equipped with a camera to focus and hone in on the requested point of attraction. A video stream is sent back to the mobile devices in use by the tour guides and tourists. The camera on the autonomous aerial vehicle is able to be oriented at an angle which does not obstruct one user's view of the requested point of attraction from another user's view of the requested point of attraction.

20 Claims, 4 Drawing Sheets

(51) Int. Cl.
*G05D 1/00* (2006.01)
*G08G 5/00* (2006.01)
*G06F 17/30* (2006.01)

(52) U.S. Cl.
CPC .......... *G06Q 50/14* (2013.01); *G08G 5/0039* (2013.01); *G08G 5/0069* (2013.01)

(56) References Cited

U.S. PATENT DOCUMENTS

| | | | |
|---|---|---|---|
| 9,741,255 B1* | 8/2017 | Navot | G08G 5/0082 |
| 9,791,281 B2* | 10/2017 | Baughman | G01C 21/20 |
| 9,797,728 B2* | 10/2017 | Eline | G01C 21/165 |
| 9,919,360 B2* | 3/2018 | Buller | G05B 19/4099 |
| 9,928,649 B2* | 3/2018 | Hu | G08G 5/0013 |
| 9,947,230 B2* | 4/2018 | Hu | G09B 9/08 |
| 2014/0018979 A1 | 1/2014 | Goossen et al. | |
| 2014/0297617 A1* | 10/2014 | Rajakarunanayake | G06F 17/30241 707/709 |
| 2015/0106010 A1 | 4/2015 | Martin et al. | |
| 2015/0142211 A1 | 5/2015 | Shehata et al. | |
| 2015/0242972 A1 | 8/2015 | Lemmey et al. | |
| 2015/0268058 A1 | 9/2015 | Samarasekera et al. | |
| 2016/0290809 A1* | 10/2016 | Eline | B64C 39/024 |
| 2017/0094258 A1* | 3/2017 | Cooper | H04N 9/09 |

FOREIGN PATENT DOCUMENTS

| | | |
|---|---|---|
| WO | 2009087543 A2 | 7/2009 |
| WO | 2010071579 A1 | 6/2010 |

OTHER PUBLICATIONS

Veas et al.; "Extended Overview Techniques for Outdoor Augmented Reality"; IEEE Transactions on Visualization and Computer Graphics; vol. 18; No. 4; Apr. 2012; pp. 565-572.

"A2—Features"; Printed Feb. 10, 2016; © 2015 DJI; 4 pages; <http://www.dji.com/product/a2/feature>.

* cited by examiner

AUTONOMOUS AERIAL POINT OF ATTRACTION HIGHLIGHTING FOR TOUR GUIDES

BACKGROUND OF THE INVENTION

The present invention relates generally to a data processing system and more specifically to highlighting and viewing a point of attraction utilizing autonomous aerial vehicles.

Autonomous aerial vehicles may be controlled via remote control from an operator located on the ground or in another vehicle by onboard computers. Historically, autonomous aerial vehicle modules were simply remotely piloted aircraft. Increasingly, onboard computer technology is being applied to employ autonomous control of the autonomous aerial vehicle modules. Applications include: tourism; aerial surveillance of crops and wildlife; acrobatic aerial footage in filmmaking; search and rescue operations; and the inspection of power lines and pipelines.

SUMMARY

According to one embodiment of this present invention, a method for highlighting a point of attraction is provided with the method comprising the steps of: receiving, by a processor, a request to view a point of attraction; determining, by a processor, an autonomous aerial vehicle from a plurality of autonomous aerial vehicles, based on preconfigured criteria, to be sent to the requested point of attraction; and receiving, by a processor, video data from the determined autonomous aerial vehicle.

Another embodiment of the present invention provides a computer program product for highlighting a point of attraction, based on the method claims above.

Another embodiment of the present invention provides a computer system for highlighting a point of attraction, based on the method claims above.

DETAILED DESCRIPTION

Autonomous aerial vehicles are increasingly being used the travel industry. In many cases, the travel guide points to a particular point of attraction and describes the point of attraction in more detail to the travelers. Some points of attraction, while having historical importance or are of traveler interest, can be physically small in stature and difficult for travelers to visualize or access. For example, the travel guide gives a verbal command to the travelers to look at a point of attraction, but the travelers may have difficulty in locating the point of attraction. Points of attractions may be static (e.g., a gargoyle high up on a cathedral) or dynamic (e.g., a condor perched in a tree in the Grand Canyon). The methods and systems of the present invention assist the travelers to highlight and get a close up view of points of attraction by utilizing autonomous aerial vehicles and mobile devices. These method and system dynamically highlight points of attraction through the use of autonomous aerial vehicles by providing a live video stream (i.e., video data) of the given point of attraction to the user's mobile device. The video stream of the given point of attraction is displayed at a viewpoint most advantageous to the users of the mobile device on the ground.

Figure 1:
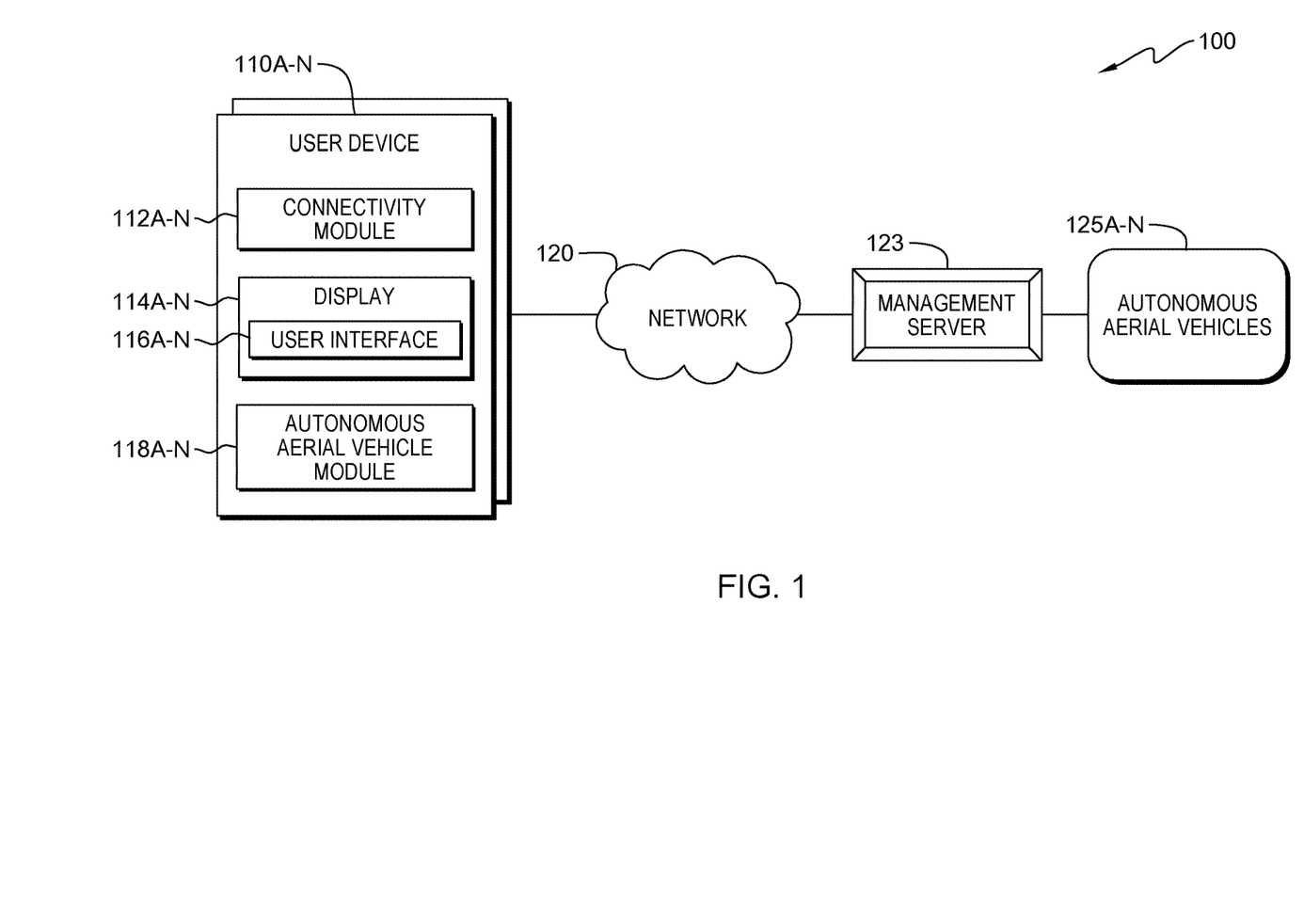
FIG. 1 is a functional block diagram illustrating a communication processing environment, in accordance with an embodiment of the present invention.

The present invention will now be described in detail with reference to the Figures. FIG. 1 is a functional block diagram illustrating a communication processing environment, generally designated 100, in accordance with one embodiment of the present invention. FIG. 1 provides only an illustration of implementation and does not imply any limitations with regard to the environments in which different embodiments may be implemented. Modifications to communication processing environment 100 may be made by those skilled in the art without departing from the scope of the invention as recited by the claims. In this exemplary embodiment, communication processing environment 100 includes user devices 110A-N and autonomous aerial vehicles 125A-N, interconnected via network 120 and management server 123.

Network 120 may be a local area network (LAN), a wide area network (WAN) such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between user devices 110A-N and management server 123, in accordance with embodiments of the invention. Network 120 may include wired, wireless, or fiber optic connections.

The notation of user devices 110A-N indicates multiple units of user device 110. Therefore, a single unit of user devices 110A-N is indicated as user device 110. Text which states "user device 110" is to be read as "a unit of user devices 110A-N".

The notation of autonomous aerial vehicles 125A-N indicates multiple units of autonomous aerial vehicle 125. Therefore, a single unit of autonomous aerial vehicles 125A-N is indicated as autonomous aerial vehicle 125. Text which states "autonomous aerial vehicle 125" is to be read as "a unit of autonomous aerial vehicles 125A-N.

The notation of autonomous aerial vehicle modules 118A-N indicates multiple units of autonomous aerial vehicle module 118. Therefore, a single unit of autonomous aerial vehicle modules 118A-N is indicated as autonomous aerial vehicle module 118. Text which states "autonomous aerial vehicle module 118" is to be read as "a unit of autonomous aerial vehicle modules 118A-N".

Management server 123 serves as the hub which establishes a connection between autonomous aerial vehicle modules 118A-N and autonomous aerial vehicles 125A-N. While connected to user devices 110A-N, management server 123 receives requests to highlight point of attractions and facilitates the return of video stream from autonomous aerial vehicles 125A-N to the requesting user devices 110A-N. Management server 123 provides connectivity to all units of autonomous aerial vehicles 125A-N and assigns individual units of autonomous aerial vehicles 125A-N on missions to capture point of attractions. The management capability of management server 123 is able to: (i) select appropriate autonomous aerial vehicles 125A-N for one or more requests; (ii) search for previously stored information about local points of interest (e.g., name, geolocation, etc.) within a database; (iii) input new information about the requested point of attraction; and (iv) coordinate autonomous aerial vehicles 125A-N to avoid collisions with other autonomous aerial vehicles 125A-N and other entities (e.g., buildings and trees). Information about the local points of interest (e.g., name, geolocation, etc.) is stored in management server 123. Furthermore, the management of autonomous aerial vehicles 125A-N ensures the flight path of a given autonomous aerial vehicle module (i.e., autonomous aerial vehicle 125) does not impede the view of points of attraction for users of user devices 110A-N on the ground. Management server 123 assists in providing an optimal view of the point of attraction for the users of user devices 110A-N (and the accompanying autonomous aerial vehicle module 118) on the ground. The optimal view of the point of attraction meets the criteria of: (i) the point of attraction is well framed in the camera devices within autonomous aerial vehicle 125; (ii) the position of autonomous aerial vehicle 125 does not obstruct a travel guide's or tour group's view of the point of attraction from the ground; and (iii) the position of autonomous aerial vehicle 125 permits the highlighting of the point of attraction while unobstructed from other obstacles (e.g., a laser tracing around the circumference of the point of attraction without overlapping other laser traces).

Autonomous aerial vehicles 125A-N are unmanned aerial vehicles. Autonomous aerial vehicles 125A-N are multiple autonomous aerial vehicle module units which receive instructions from management server 123. Autonomous aerial vehicles 125A-N are preconfigured to communicate with management server 123 across network 120. Each of autonomous aerial vehicles 125A-N contain cameras to capture live streams of a point of attraction and ensure autonomous aerial vehicle 125 is positioned correctly and laser lights/flashlight to highlight the circumference of the point of attraction or illuminate the point of attraction. Responsive to an initial request received by autonomous aerial vehicle module 118 (wherein the request is further relayed to management server 123), a single unit among autonomous aerial vehicles 125A-N (i.e., autonomous aerial vehicle 125) is sent to the point of attraction. Upon highlighting a point of attraction, autonomous aerial vehicle 125 applies environment appropriate lighting (e.g., a laser tracing the circumference of a point of attraction during daylight hours, or a directed flashlight illumination of a point of attraction during nighttime hours) and assigned colors based on requested point of attractions. For example, the color red is assigned to the user of autonomous aerial vehicle module 118A on user device 110A to distinguish the point of attraction as requested by the user of autonomous aerial vehicle module 118A from the point of attraction as requested by other users.

User devices 110A-N are mobile devices. In other embodiments, user devices 110A-N may be a laptop computer, a tablet computer, a thin client, or personal digital assistant (PDA). In general, user devices 110A-N may be any mobile electronic device or mobile computing system capable of sending and receiving data, and communicating with a receiving device over network 120. User devices 110A-N include internal and external hardware components, as depicted and described in further detail with respect to FIG. 4. User devices 110A-N contains connectivity modules 112A-N, displays 114A-N, and user interfaces 116A-N, and autonomous aerial vehicle modules 118A-N. With the aid of autonomous aerial vehicle module 118, user devices 110A-N send requests to management server 123, which aims to capture point of attractions via speech, text, or images. User devices 110A-N receive live video stream from autonomous aerial vehicle 125 via management server 123.

In this exemplary embodiment, connectivity modules 112A-N contain a baseband processor which manages all the radio or any functions that require an antenna, such as WiFi and Bluetooth functions, for connecting to a wireless network, such as the Internet, and for connecting to other devices. Connectivity modules 112A-N include a subscriber identification module (SIM) which protects, identifies, and authenticates the identity of the user of the phone.

In this exemplary embodiment, displays 114A-N may be composed of, for example, a liquid crystal display screen, an organic light emitting diode display screen, or other types of display screens. Displays 114A-N contain user interfaces (UI) 116A-N. Displays 114A-N consist of a screen where the screen (which has touch screen capability) is composed of an insulator such as a glass coated with a transparent electrical conductor-indium titanium oxide.

User interfaces 116A-N may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interfaces 116A-N are capable of receiving data, user commands, and data input modifications from a user.

Autonomous aerial vehicle modules 118A-N are implemented when the users of user devices 110A-N are interested in highlighting a point of attraction. Autonomous aerial vehicle modules 118A-N are a mobile application, which can be installed on user devices 110A-N, and directly communicate with management server 123. Furthermore, of user device 110 uses autonomous aerial vehicle module 118 in order to allow the user of user device 110 to communicate with management server 123 across a network. In an exemplary embodiment, the users of user devices 110A-N are tourists and/or a tour guide wishing to locate and view a local point of attraction. Autonomous aerial vehicle modules 118A-N receive the user requests via text, speech, or image in order to view the point of attraction on user device 110. As a result of these user requests, an appropriate nearby single unit (i.e., autonomous aerial vehicle 125) among autonomous aerial vehicles 125A-N is dispatched to the point of attraction via management server 123. The appropriate single unit of autonomous aerial vehicles 125A-N highlights the point of attraction. For example, autonomous aerial vehicle 125 applies a laser or a flashlight in conjunction with a color unique to each of user devices 110A-N. Autonomous aerial vehicle modules 118A-N receive the live streaming back video footage of the point of attraction captured by an onboard camera on autonomous aerial vehicle 125. The video stream can be streamed to one or multiple user devices 110A-N without obstructing a user's viewpoint of the point of attraction from the ground.

Figure 2:
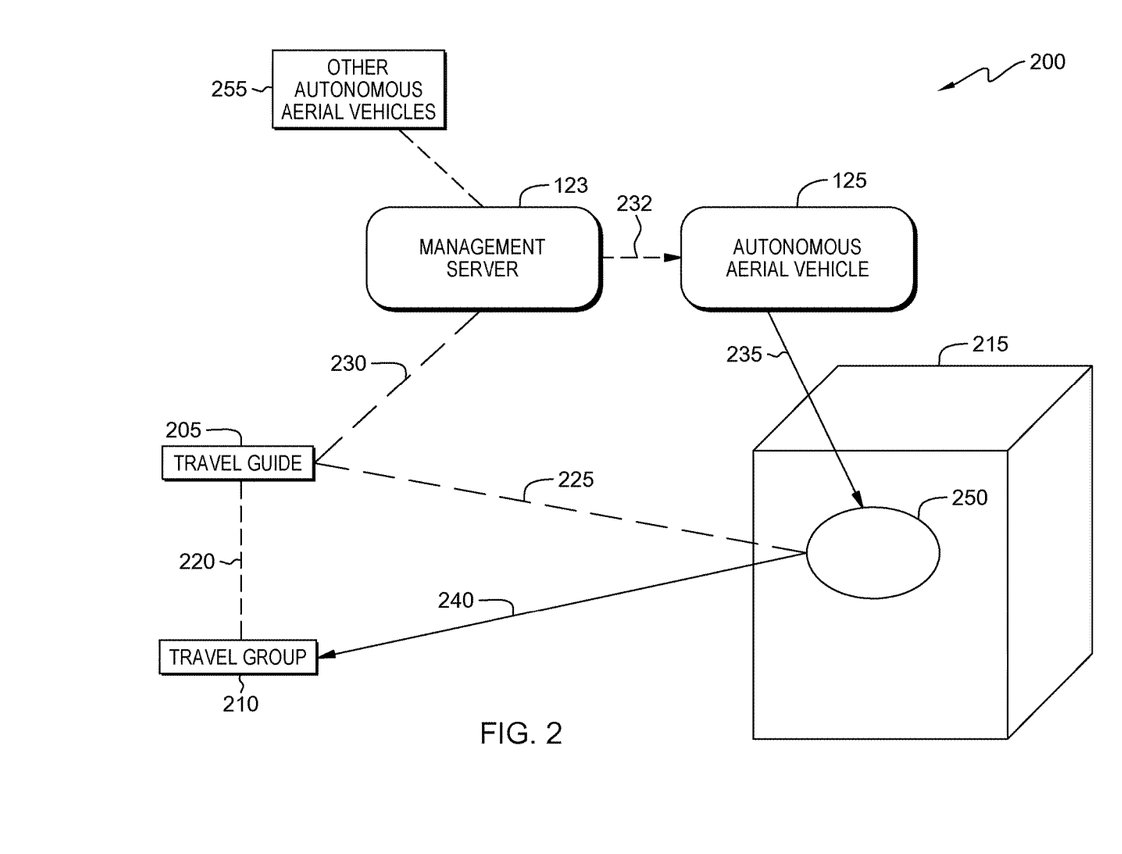
FIG. 2 is a block diagram depicting autonomous aerial vehicle usage while on a guided tour, in accordance with an embodiment of the present invention.

FIG. 2 is block diagram 200 depicting an example of autonomous aerial vehicle usage while on a guided tour, in accordance with an embodiment of the present invention.

In this exemplary embodiment, tourists among travel group 210 are visiting a historical site 215. Travel guide 205 is leading a tour of site 215. Travel guide 205 is directly speaking to travel group 210 as denoted by communication 220. Communication 220 is a verbal and a bi-directional interaction between travel guide 205 and travel group 210, where these two parties engage in an interactive conversation with each other. Each member of travel guide 205 and travel group 210 are in possession of user device 110 while on the tour. User device 110 contains autonomous aerial vehicle module 118. Travel guide 205, while engaging with travel group 210, is describing point of attraction 250, which is a specific portion of site 215. Travel guide 205 is focusing on point of attraction 250 by gesturing at point of attraction 250 as depicted by gesture 225. Point of attraction 250 is difficult for travel guide 205 and travel group 210 to visualize and access. Travel guide 205 uses autonomous aerial vehicle module 118 to directly send request 230 to a nearby and available autonomous aerial vehicle 125 via management server 123 in order to highlight point of attraction 250. Request 230 is an instruction based on the content of communication 220 wherein communication 220 is describing point of attraction 250. The instruction can be in the form of voice data, text data, or image data. Management server 123 receives request 230 from a unit of autonomous aerial vehicle module 118 utilized by travel guide 205. Management server 123 finds the closest autonomous aerial vehicle 125, which can fulfill request 230. Assignment 232 is a signal sent by management server 123 to autonomous aerial vehicle 125. Autonomous aerial vehicle 125 has been determined to be the best autonomous aerial vehicle to be sent to highlight point of attraction 250. Other autonomous aerial vehicles 255 is a set of autonomous aerial vehicles 125A-N determined not appropriate to be sent to highlight point of attraction 250. The determination of the appropriate autonomous aerial vehicle 125 is based on multiple factors such as proximity (i.e., distance) to the requested point of attraction 250, availability of autonomous aerial vehicle 125, etc. Autonomous aerial vehicle 125 is sent to point of attraction 250 and highlights point of attraction 250 via light signal 235. Light signal 235 is applied in order to depict point of attraction 250 as a video stream. Result signal 240 is sent to travel group 210 where the travel group 210 have autonomous aerial vehicle module 118 on their user device 110. Result signal 240 is the video stream from target light signal 235 which allows travel guide 205 to visualize point of attraction 250 on user device 110 (via autonomous aerial vehicle module 118). Since access is limited to point of attraction 250 and the real-world visualization of point of attraction 250 is difficult for travel guide 205 and travel group 210, autonomous aerial vehicle 125 in conjunction with autonomous aerial vehicle module 118 allows travel group 210 and travel guide 205 to visualize point of attraction 250 through user device 110.

Figure 3:
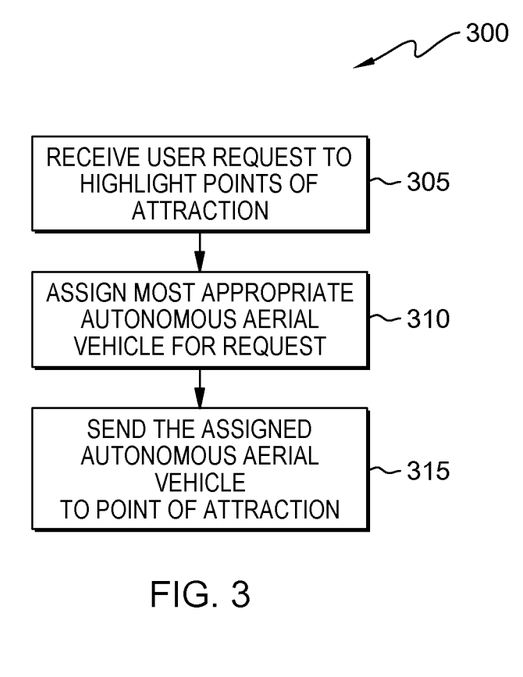
FIG. 3 is a flowchart depicting the steps facilitating the usage of autonomous aerial vehicles, in accordance with an embodiment of the present invention.

FIG. 3 is flowchart 300 depicting the steps facilitating the usage of autonomous aerial vehicles via autonomous aerial vehicle module 118, in accordance with an embodiment of the present invention.

In step 305, management server 123 receives a user request to highlight points of attractions. A user of user device 110 may be a tour guide (e.g., travel guide 205 in FIG. 2) or an individual tourist (e.g., travel group 210 in FIG. 2). Point of attraction 250 is identified by using one of three input methods: (i) speech data where a speaker verbally states the name of the point of attraction (e.g., "show me the gargoyle on the right side of the palace"); (ii) text data request of a point of attraction (e.g., "gray gargoyle on right of palace"); and (iii) image data where the user supplies an image or takes a photograph of point of attraction 250 to be highlighted. Autonomous aerial vehicle module 118 directly sends the request to management server 123.

In step 310, management server 123 assigns the most appropriate autonomous aerial vehicle for the request (received from step 305). Server such as management server 123 directly receives a request to highlight point of attraction 250 from autonomous aerial vehicle module 118. Management server 123 makes determinations on: (i) the location point of attraction 250 by analyzing the request and comparing it to the known points of attraction defined in a preconfigured condition (information on local points of interest, autonomous aerial vehicles 125A-N which can communicate with management server 123, and permitting communication between management server 123 and user device 110); (ii) which autonomous aerial vehicles 125A-N are currently in use and whether autonomous aerial vehicle 125 is currently highlighting the point of attraction 250 (as requested in step 305); and (iii) assignments of autonomous aerial vehicles 125A-N if a new mission must be created for the request (from step 305). For example, among autonomous aerial vehicles 125A-N, autonomous aerial vehicle 125A is in use during an in-flight mission. Autonomous aerial vehicle module 118 sends request 230 (from FIG. 2) for highlighting point of attraction 250, to management server 123 wherein management server 123 determines autonomous aerial vehicle 125A is on an in-flight mission. Management server 123 sends request 230 to autonomous aerial vehicle 125A, where request 230 is combined with other requests assigned to autonomous aerial vehicle 125A. If point of attraction 250 is not currently being highlighted by autonomous aerial vehicle 125A, then a new mission is created and assigns the most appropriate autonomous aerial vehicle 125 to be selected among autonomous aerial vehicles 125A-N based on predefined criteria (e.g., autonomous aerial vehicle 125 is closest to point of attraction 250 and autonomous aerial vehicle 125 has the most available battery power). Furthermore, the assignment of a new mission is based on the following considerations on autonomous aerial vehicles 125A-N: (i) the geolocation of point of attraction 250 in terms of the coordinates of where autonomous aerial vehicle 125 must fly to and the direction autonomous aerial vehicle 125 must face in order to highlight point of attraction 250; (ii) the relative position of autonomous aerial vehicle 125 to the requesting user where autonomous aerial vehicle 125 should highlight point of attraction 250 at an optimum angle most visible to the requesting user while not obstructing the viewpoint of point of attraction 250 to other users under control by management server 123; (iii) the geolocation information from user devices 110A-N to determine the relative position of user devices 110A-N to autonomous aerial vehicles 125A-N and point of attraction 250 (based on management server 123); and (iv) the flight path of autonomous aerial vehicles 125A-N wherein the assigned autonomous aerial vehicle 125 receives a calculated flight path, which ensures autonomous aerial vehicle 125 does not collide with another unit among autonomous aerial vehicles 125A-N or other entities. Management server 123 has determined among autonomous aerial vehicles 125A-N which autonomous aerial vehicle 125 to send out to point of attraction 250. This determination is referred to as mission data. The mission data is communicated from management server 123 to the appropriate autonomous aerial vehicle 125.

In step 315, management server 123 sends the assigned autonomous aerial vehicle to the point of attraction. Autonomous aerial vehicle 125 (i.e., the assigned autonomous aerial vehicle) flies the route mission autonomously and is positioned to capture point of attraction 250. The positions of autonomous aerial vehicle 125 are constantly relayed back to management server 123 via network 120 (e.g., WiFi and Lightbridge). Autonomous aerial vehicle 125 targets/highlights point of attraction 250 and directs a light (reminiscent of light signal 235) at point of attraction 250 based on the geolocation coordinates. The projection of the light onto point of attraction 250 can be depend upon multiple factors including weather conditions and time of day. For example, autonomous aerial vehicle 125 may project a laser beam, which circles the circumference of point of attraction 250, during daylight hours. In another example, autonomous aerial vehicle 125 uses a directed flashlight, which lights up point of attraction 250, at night. Autonomous aerial vehicle 125 begins a mission to fly to the point of attraction, and a live video feed from the on-board camera on autonomous aerial vehicle 125 is sent back to management server 123 and subsequently to user devices 110A-N. More specifically, the video feed is streamed to the users of user devices 110A-N via autonomous aerial vehicle module 118, based on the area illuminated with light. This allows the user to see the video stream from autonomous aerial vehicle 125 approach point of attraction 250 and to obtain a detailed view of point of attraction 250 on user device 110. Without autonomous aerial vehicle module 118, the video feed cannot be viewed on user device 110. Different live video streams (based on different requests to highlight a point of attraction) can be simultaneously sent back to user devices 110A-N, wherein a different live video stream is displayed on each user device 110 among user devices 110A-N. Through autonomous aerial vehicle module 118, colors can be assigned to a specific user of user device 110. For example, a user of user device 110 is informed that his requested point of attraction 250 will be highlighted in red. Subsequently, a red laser or red flashlight is applied by autonomous aerial vehicle 125. This helps distinguish the point of attraction from different users of user devices 110A-N.

Figure 4:
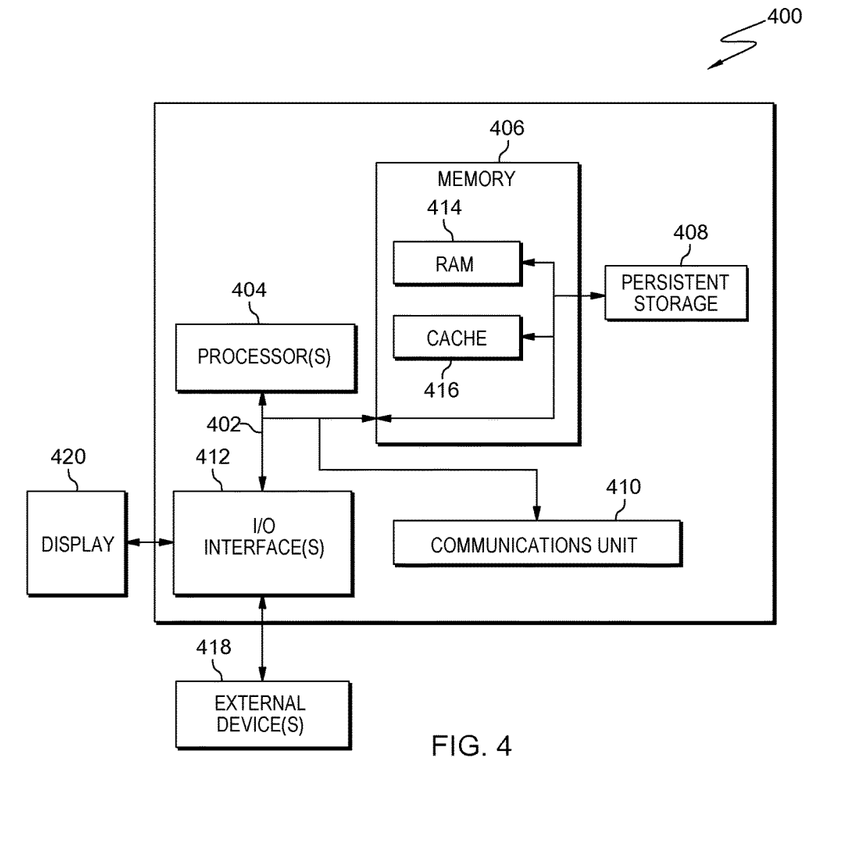
FIG. 4 depicts a block diagram of internal and external components of a computing device, in accordance with an embodiment of the present invention.

FIG. 4 depicts a block diagram of internal and external components of computing device 400, such as the mobile devices of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Program instructions and data used to practice embodiments of the present invention may be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for highlighting a point of attraction, comprising the steps of:
    receiving, by a processor, a request to view a point of attraction;
    determining, by the processor, an autonomous aerial vehicle from a plurality of autonomous aerial vehicles, based on preconfigured criteria, to be sent to the requested point of attraction;
    tracing, by the processor, a circumference with a laser, wherein the circumference contains at least the point of attraction;
    receiving, by the processor, video data from the determined autonomous aerial vehicle, wherein the video data hones in on the circumference by illuminating the circumference with lighting;
    focusing, by the processor, on the point of attraction contained within the circumference; and
    displaying, by the processor, the video data depicting the point of attraction as a respective output for each user of a plurality of users, wherein the displayed video data is distinct for each respective user of the plurality of users.

2. The method of claim 1, wherein the request to view the point of attraction comprises at least one of: speech data, text data, and image data.

3. The method of claim 1, wherein determining the autonomous aerial vehicle from the plurality of autonomous aerial vehicles, comprises:
    communicating, by the processor, with the plurality of autonomous aerial vehicles;

searching, by the processor, a database for a stored request to view the point of attraction;
storing, by the processor, data associated with the request; and
receiving, by the processor, a geolocation of the requested point of attraction.

4. The method of claim 1, wherein the preconfigured criteria comprises determining at least one of:
a distance between the autonomous aerial vehicle and the point of attraction;
an available battery power of the autonomous aerial vehicle; and
whether an in-flight mission to fulfill a request to view a point of attraction is similar to the requested point of attraction.

5. The method of claim 3, wherein communicating with the plurality of autonomous aerial vehicles, comprises:
determining, by the processor, an angle of the point of attraction most visible to each user of a plurality of users; and
determining, by the processor, an angle of a camera depending: on previously stored data in a management server and a relative position of a user to the requested point of attraction, wherein the angle of the camera does not obstruct a first view of the point of attraction to a first user of the plurality of users, from a second view of the point of attraction to a second user of the plurality users.

6. The method of claim 1, further comprising:
responsive to receiving the video data from the determined autonomous aerial vehicle, displaying, by the processor, the video data of the point of attraction, wherein a user's view of the point of attraction is unobstructed by the autonomous aerial vehicle.

7. The method of claim 5, further comprising:
assigning, by the processor, a first color of a set of assigned colors to the first user of the plurality of users;
assigning, by the processor, a second color of a set of assigned colors to the second user of the plurality of users; and
displaying, by the processor, the video data of the requested point of attraction in the first color to the first user of the plurality of users and in the second color to the second user of the plurality of users.

8. A computer program product for highlighting a point of attraction, the computer program product comprising:
a computer readable storage medium and program instructions stored on the computer readable storage medium, the program instructions comprising:
program instructions to receive a request to view a point of attraction;
program instructions to determine an autonomous aerial vehicle from a plurality of autonomous aerial vehicles, based on preconfigured criteria, to be sent to the requested point of attraction;
program instructions to trace a circumference, wherein the circumference contains at least the point of attraction;
program instructions to receive video data from the determined autonomous aerial vehicle, wherein the video data hones in on the circumference by illuminating the circumference with lighting;
program instructions to focus on the point of attraction contained within the circumference; and
program instructions to display the video data depicting the point of attraction as a respective output to each user of a plurality of users, wherein the displayed video data is distinct for each respective user of the plurality of users.

9. The computer program product of claim 8, wherein the request to view the point of attraction comprises at least one of: speech data, text data, and image data.

10. The computer program product of claim 8, wherein program instructions to determine the autonomous aerial vehicle from the plurality of autonomous aerial vehicles, comprise:
program instructions to communicate with the plurality of autonomous aerial vehicles;
program instructions to search a database for a stored request to view the point of attraction;
program instructions to store data associated with the request; and
program instructions to receive a geolocation of the requested point of attraction.

11. The computer program product of claim 8, wherein the preconfigured criteria comprises program instructions to determine at least one of:
a distance between the autonomous aerial vehicle and the point of attraction;
an available battery power of the autonomous aerial vehicle; and
whether an in-flight mission to fulfill a request to view a point of attraction is similar to the requested point of attraction.

12. The computer program product of claim 10, wherein program instructions to communicate with the plurality of autonomous aerial vehicles, comprise:
program instructions to determine an angle of the point of attraction most visible to each user of a plurality of users; and
program instructions to determine an angle of a camera depending: on previously stored data in a management server and a relative position of a user to the requested point of attraction, wherein the angle of the camera does not obstruct a first view of the point of attraction to a first user of the plurality of users, from a second view of the point of attraction to a second user of the plurality of users.

13. The computer program product of claim 8, further comprising:
responsive to receiving the video data from the determined autonomous aerial vehicle, program instructions to display the video data of the point of attraction, wherein a user's view of the point of attraction is unobstructed by the autonomous aerial vehicle.

14. The computer program product of claim 12, further comprising:
program instructions to assign a first color of a set of assigned colors to the first user of the plurality of users;
program instructions to assign a second color of a set of assigned colors to the second user of the plurality of users; and
program instructions to display video data of the requested point of attraction in the first color to the first user of the plurality of users and in the second color to the second user of the plurality of users.

15. A computer system for highlighting a point of attraction, the computer system comprising:
one or more computer processors;
one or more computer readable storage media;

program instructions stored on the one or more computer readable storage media for execution by at least one of the one or more processors, the program instructions comprising:

program instructions to receive a request to view a point of attraction;

program instructions to determine an autonomous aerial vehicle from a plurality of autonomous aerial vehicles, based on preconfigured criteria, to be sent to the requested point of attraction;

program instructions to trace a circumference, wherein the circumference contains the point of attraction;

program instructions to receive video data from the determined autonomous aerial vehicle, wherein the video data hones in on the circumference by illuminating the circumference with lighting;

program instructions to focus on the point of attraction contained within the circumference; and program instructions to display the video data depicting the point of attraction as a respective output to each user of a plurality of users, wherein the displayed video data is distinct for each respective user of the plurality of users.

16. The computer system of claim 15, wherein the request to view the point of attraction comprises at least one of: speech data, text data, and image data.

17. The computer system of claim 15, wherein program instructions to determine the autonomous aerial vehicle from the plurality of autonomous aerial vehicles, comprise:

program instructions to communicate with the plurality of autonomous aerial vehicles;

program instructions to search a database for a stored request to view the point of attraction;

program instructions to store data associated with the request; and program instructions to receive a geolocation of the requested point of attraction.

18. The computer system of claim 15, wherein the preconfigured criteria comprises program instructions to determine at least one of:

a distance between the autonomous aerial vehicle and the point of attraction;

an available battery power of the autonomous aerial vehicle; and whether an in-flight mission to fulfill a request to view a point of attraction is similar to the requested point of attraction.

19. The computer system of claim 17, wherein program instructions to communicate with the plurality of autonomous aerial vehicles, comprise:

program instructions to determine an angle of the point of attraction most visible to each user of the plurality of users; and program instructions to determine an angle of a camera depending: on previously stored data in a management server and a relative position of a user to the requested point of attraction, wherein the angle of the camera does not obstruct a first view of the point of attraction to a first user of the plurality of users, from a second view of the point of attraction to a second user of the plurality of users.

20. The computer system of claim 15, further comprising:

responsive to receiving the video data from the determined autonomous aerial vehicle, program instructions to display the video data of the point of attraction, wherein a user's view of the point of attraction is unobstructed by the autonomous aerial vehicle.

* * * * *